United States Patent
Peng et al.

(10) Patent No.: US 11,881,038 B2
(45) Date of Patent: Jan. 23, 2024

(54) MULTI-DIRECTIONAL SCENE TEXT RECOGNITION METHOD AND SYSTEM BASED ON MULTI-ELEMENT ATTENTION MECHANISM

(71) Applicants: Tsinghua University, Beijing (CN); Hyundai Motor Company, Seoul (KR); Kia Corporation, Seoul (KR)

(72) Inventors: Liangrui Peng, Beijing (CN); Ruijie Yan, Beijing (CN); Shanyu Xiao, Beijing (CN); Gang Yao, Beijing (CN); Shengjin Wang, Beijing (CN); Jaesik Min, Gyeonggi-do (KR); Jong Ub Suk, Seoul (KR)

(73) Assignees: TSINGHUA UNIVERSITY, Beijing (CN); HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 78 days.

(21) Appl. No.: 17/502,533

(22) Filed: Oct. 15, 2021

(65) Prior Publication Data

US 2022/0121871 A1    Apr. 21, 2022

(30) Foreign Application Priority Data

Oct. 16, 2020 (CN) .......................... 202011107999.1

(51) Int. Cl.
*G06V 20/00* (2022.01)
*G06V 20/62* (2022.01)
(Continued)

(52) U.S. Cl.
CPC ............ *G06V 20/62* (2022.01); *G06F 18/213* (2023.01); *G06N 3/045* (2023.01); *G06V 10/40* (2022.01); *G06V 10/95* (2022.01); *G06V 30/10* (2022.01)

(58) Field of Classification Search
CPC ............ G06N 3/08; G06N 3/045; G06N 5/04; G06N 3/0464; G06F 18/253;
(Continued)

(56) References Cited

U.S. PATENT DOCUMENTS

2007/0033170 A1  2/2007  Sull et al.
2020/0285879 A1* 9/2020  Cheng .................. G06V 10/768

FOREIGN PATENT DOCUMENTS

| CN | 107679585 A | 2/2018 |
| CN | 111259768 A | 6/2020 |
| CN | 111259773 A * | 6/2020 |
| CN | 111325099 A | 6/2020 |

OTHER PUBLICATIONS

Lyu et al, 2D Attentional Irregular Scene Text Recognizer, arXiv:1906. 05708v1 Jun. 13, 2019.*
(Continued)

*Primary Examiner* — Ping Y Hsieh
*Assistant Examiner* — Xiao Liu
(74) *Attorney, Agent, or Firm* — MORGAN, LEWIS & BOCKIUS LLP

(57) ABSTRACT

A method of multi-directional scene text recognition based on multi-element attention mechanism include: performing normalization processing for a text row/column image output from an external text detection module by a feature extractor, extracting a feature for the normalized image by using a deep convolutional neural network to acquire an initial feature map, adding a 2-dimensional directional positional encoding P to the initial feature map in order to output a multi-channel feature map, converting the multi-channel feature map output from a feature extractor by an encoder into a hidden representation, and converting the hidden representation output from the encoder into a recognized text by a decoder and using the recognized text as the output result.

19 Claims, 9 Drawing Sheets

(51) Int. Cl.
  *G06V 10/40* (2022.01)
  *G06V 10/94* (2022.01)
  *G06F 18/213* (2023.01)
  *G06N 3/045* (2023.01)
  *G06V 30/10* (2022.01)

(58) Field of Classification Search
  CPC .... G06F 18/213; G06F 18/25; G06F 16/3344; G06F 40/211; G06F 40/205; G06F 16/5846; G06F 40/10; G06F 17/175; G06T 7/73; G06T 2207/30176; G06V 10/82; G06V 30/10; G06V 10/40; G06V 10/44; G06V 20/62; G06V 20/63; G06V 20/625; G06V 30/413; G06V 20/00; G06V 10/806; G06V 10/7715; G06V 10/32; G06V 30/148; G06V 30/158; G06V 20/635; G06V 30/347; G06V 40/1347
  See application file for complete search history.

(56) References Cited

OTHER PUBLICATIONS

Ashish et al., Attention is all you need, NIPS (Year: 2017).*
Zheng et al., GMAN: A Graph Multi-Attention Network for Traffic Prediction, Thirty-Fourth AAAI Conference on Artificial Intelligence (AAAI) (Year: 2020).*
Qi et al, Attentive Relational Networks for Mapping Images to Scene Graphs, CVPR (Year: 2019).*
Xie, et al., "Baseline-independent feature extraction for Arabic Writing", 2012, J. Tsinghua Univ. (Sci & Tech) vol. 52, p. 1682-1686 (See English Abstract).
Cai, et al., "TH-GAN: Generative Adversarial Network based Transfer Learning for Historical Chinese Character Recognition", 2019, International Conference on Document Analysis and Recognition (ICDAR), p. 178-183.
Office Action dated Oct. 18, 2023 for corresponding Chinese Patent Application No. 202011107999.1 (See English Translation).

* cited by examiner

GROUND-TRUTH: ronaldo
RECOGNITION RESULT: ronaldo

GROUND-TRUTH: allahabad
RECOGNITION RESULT: allahabad

GROUND-TRUTH: starbucks
RECOGNITION RESULT: starbucks

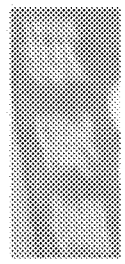

GROUND-TRUTH: 富观街
RECOGNITION RESULT: 富观街

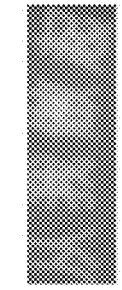

GROUND-TRUTH: 从我做起
RECOGNITION RESULT: 从我做起

GROUND-TRUTH: 保护环境
RECOGNITION RESULT: 保护环境

GROUND-TRUTH: 乔迁之喜
RECOGNITION RESULT: 乔迁之喜

GROUND-TRUTH: 鸟语花香
RECOGNITION RESULT: 鸟语花香

GROUND-TRUTH: 沙县小吃
RECOGNITION RESULT: 沙县小吃

MULTI-DIRECTIONAL SCENE TEXT RECOGNITION METHOD AND SYSTEM BASED ON MULTI-ELEMENT ATTENTION MECHANISM

CROSS-REFERENCE TO RELATED APPLICATION

This application claims priority to and the benefit of Chinese Patent Application No. 202011107999.1 filed in the Chinese National Intellectual Property Administration on Oct. 16, 2020, the entire contents of which are incorporated herein by reference.

BACKGROUND OF THE INVENTION

(a) Field of the Invention

The present invention relates to an information processing technical field, and particularly, to a method and a system of multi-directional scene text recognition based on multi-element attention mechanism.

(b) Description of the Related Art

Scene text recognition is a state-of-the-art task in computer vision and machine learning fields, and there are wide range of application scenarios including autonomous driving and robot vision. Scene text recognition is challenging due to diverse variations of text instances in natural scene images, including complex backgrounds, different foreground contents, lighting and imaging conditions, and one of the key problems is to handle multi-oriented and curved text instances. Further, during the imaging process, a scene text image may have various changes such as skew and perspective distortion.

Scene text recognition methods may be categorized into traditional methods and deep learning based methods. The traditional methods adopt handcrafted features and character segmentation and recognition-based method or a sequence modeling method based on Hidden Markov Model. A method based on deep learning generally consists of a Convolutional Neural Network and a Recurrent Neural Network such as Long Short-Term Memory network, but such model is limited in its adaptability to multi-oriented and curved texts.

The above information disclosed in this Background section is only for enhancement of understanding of the background of the invention, and therefore it may contain information that does not form the prior art that is already known in this country to a person of ordinary skill in the art, and should not be taken as acknowledgment that this information forms any part of the prior art.

SUMMARY OF THE INVENTION

The present invention has been made in an effort to provide a method and a system of multi-directional scene text recognition based on multi-element attention mechanism.

An exemplary embodiment of the present invention provides a method of multi-directional scene text recognition based on multi-element attention mechanism, which includes: performing, by a feature extractor, normalization processing for a text row/column image I output from an external text detection module, extracting, by the feature extractor, features for the normalized image by using a deep convolutional neural network to acquire an initial feature map $F_0$, adding, by the feature extractor, 2-dimensional directional positional encoding P to the initial feature map $F_0$ in order to output a multi-channel feature map F, wherein the size of the feature map F is $H_F \times W_F$, and the number of channels is D; modeling, by an encoder, each element of the feature map F output from the feature extractor as a vertex of a graph, converting, by the encoder, the multi-channel feature map F into a hidden representation H through designing a local adjacency matrix, a neighboring adjacency matrix, and a global adjacency matrix for the graph, and implementing local, neighboring, and global multi-element attention mechanisms; and converting, by a decoder, the hidden representation H output from the encoder into recognized text as the output result.

The performing of the normalization processing for the text row/column image I output from the external text detection module by the feature extractor includes determining, by the feature extractor, whether the text row/column image I is a horizontal or vertical text according to the width and the height of the text row/column image I, and setting a horizontal/vertical flag according to the determination result, when the height of the text row/column image I is larger than γ times of the width of the text row/column image I, setting, by the feature extractor, the horizontal/vertical flag to 0 which is corresponding to vertical text, and when the height of the text row/column image I is equal to or smaller than γ times of the width of the text row/column image I, setting, by the feature extractor, the horizontal/vertical flag to 1 which is corresponding to horizontal text, and setting γ to a constant number of 1.5, setting, by the feature extractor, the image normalization width $W_I$ to 256, and setting the height $H_I$ to 64 in the case of the horizontal text, and setting, by the feature extractor, the image normalization width $W_I$ to 64, and setting the height $H_I$ to 256 in the case of the vertical text, and a bilinear interpolation method is used for the image normalization.

The deep convolutional neural network is a U-shaped structure deep convolutional neural network, and the adopted backbone network is EfficientNet-B3, an output through the deep convolutional neural network is the initial feature map $F_0$ in which the size is $H_F \times W_F$ and the number of channels is D, the deep convolutional neural network includes a total of 7 convolution blocks of the first to seventh convolution blocks, and the size of the feature map output from the third convolution block is $H_F \times W_F$, the number of channels is $D_3$, the size of the feature map output from the fifth convolution block is $$\frac{H_F}{2} \times \frac{W_F}{2},$$

and the number of channels is $D_5$, and the size of the feature map output from the seventh convolution block is $$\frac{H_F}{4} \times \frac{W_F}{4},$$

and the number of channels is D, and the feature map output from the seventh convolution block after the upsampling operation is added to the output result acquired by passing the output of the fifth convolution block through a 1×1 convolution with the channel number of D, and the acquired result after the upsampling operation is added to the output result acquired by passing the output of the third convolution block through a 1×1 convolution with the channel number of D, then the initial feature map $F_0$ is acquired through one 1×1 convolution with the channel number of D.

When the horizontal/vertical flag is 1, the positional encoding P is $$P_{(i,j,2k)}=\sin(j/T^{2k/D}), \text{ and}$$

$$P_{(i,j,2k+1)}+\cos(j/T^{2k/D}),$$

when the horizontal/vertical flag is 0, the positional encoding P is $$P_{(i,j,2k)}=\sin(i/T^{2k/D}), \text{ and}$$

$$P_{(i,j,2k+1)}+\cos(i/T^{2k/D}),$$

wherein (i, j) represents an i-th row, j-th column location in the initial feature map $F_0$, k represents the index channel number of the initial feature map $F_0$, D represents the number of channels of the initial feature map $F_0$, and T represents a predetermined constant number, and a multi-channel feature map F is acquired by adding the positional encoding P and the initial feature map $F_0$ to achieve $F=F_0+P$.

The encoder decomposes the elements of the multi-channel feature map F to a vector according to column order, and obtains a feature matrix X, and the dimension of the feature matrix X is N×D, i.e., an N-row and D-column matrix, the N represents the number of elements of each channel, $N=H_F \times W_F$, and D represents the number of channels of the feature map, and the calculation of the multi-element attention mechanism is represented by $$MEA(X) = softmax\left(\frac{AXW_QW_K^TX^TB^T}{\sqrt{D}}\right)XW_V,$$

and here, $W_Q$, $W_K$, and $W_V$ are parameter matrices, each dimension is D×D, adjacency matrices A and B are used for modeling the spatial correlation of the feature after mapping by $W_Q$ and $W_K$, and the dimension is N×N.

In the local attention module $MEA_{Local}$, the adjacency matrices A and B are identity matrices, in the neighboring attention module $MEA_{Neighbor}$, the adjacency matrices A and B have the save form as a circulant matrix which is subjected to a convolution operation for the feature map F by using a convolution kernel with the size of k×k and all 1s as the element values, and wherein, a value of k is smaller than the width and the height of the feature map F, and in the global attention module $MEA_{Global}$, values of the adjacency matrices A and B are randomly initialized, and trained with the entire network, in respect to calculation of $AXW_Q$ and $W_K^TX^TB^T=(BXW_K)^T$, two fully connected layers are respectively used on the feature vector dimension and the channel dimension, adjacency matrices A and B are implemented by using 1-dimensional convolution operation in which the size of the convolution kernel is 1×1, and the number of channels is N, and parameter matrices $W_Q$ and $W_K$ are implemented by using 1-dimensional convolution operation in which the size of the convolution kernel is 1×1, and the number of channels is D.

The calculation process of the hidden representation H is $H=LN(Z+FFD(Z))$, wherein LN means a layer normalization operation, and $Z+FFD(Z)$ means a residual connection, a calculation process of a feed forward network module is $FFD(Z)=conv_2(\varphi(conv_1(Z)))$, $conv_1$ and $conv_2$ denote multi-channel 1-dimensional convolutions with the kernel size of 1×1, and φ represents an activation function of a Gaussian error linear unit (GELU), and the calculation process of Z is $$Z=conv_3(Y_1)\|conv_4(Y_2)\|conv_5(Y_3)$$

$$Y_1=LN(X+MEA_{Local}(X))$$

$$Y_2=LN(X+MEA_{Neighbor}(X))$$

$$Y_3=LN(X+MEA_{Global}(X))$$

and wherein $conv_3$, $conv_4$, and $conv_5$ are 1×1 convolution operations in which the number of channels is D/3, where D is the channel number of the original feature maps, the symbol "∥" means a channel-dimension concatenation operation, $MEA_{Local}$, $MEA_{Neighbor}$, and $MEA_{Global}$ mean a local attention module, a neighboring attention module, and a global attention module, respectively, and $X+MEA_{Local}(X)$, $X+MEA_{Neighbor}(X)$, and $X+MEA_{Global}(X)$ are residual connections.

The decoder is a bidirectional structure including a forward decoder and a backward decoder, and the forward decoder recognizes a text image in the same direction as a reading order and the backward decoder recognizes the text image in the opposite direction to the reading order, the decoder of each direction includes two identical decoding units, and each decoding unit includes one self-attention layer, one encoder-decoder attention layer, and one feed forward network module, the dimension output in each step of the decoder is converted into a dimension of a character set size by using one fully connected layer, and then a likelihood value of the character output in each step is acquired through a softmax function, and a log likelihood value is acquired by taking a log operation, and for the input text row/column image I, each of the forward decoder and the backward decoder outputs one recognition result, in which the recognition result with higher log likelihood value is selected as the final recognition result, and the recognition result log likelihood value is the average value of all character log likelihood values in a text sequence.

An input of the decoder includes two parts, the first part is hidden representations output from the encoder, the second part is the text ground-truth in the training stage, or the recognition text output from the decoder in the test stage, the character sequence of the second part input is gradually converted into the vector through character embedding, and processed by the self-attention layer, and then sent to the encoder-decoder attention layer together with the first part input, and the acquired result is input into the feed forward network module to acquire a decoder output, in the training stage, mask processing is introduced into the decoder self-attention layer, and only the current character and the previous text ground-truth are used when calculating the attention score, in the training stage, the cross entropy of the recognized text and the text ground-truth is set as the objective function, and optimization is performed for parameters of the entire network including the feature extractor, the encoder, and the decoder, and in the training stage, horizontal scene text and vertical scene text training data are divided into two subsets according to the direction, and data of each iteration are drawn from two subsets according to Equations 1 and 2 below when training, $$p_H = \frac{N_H}{N_H + N_V} \quad \text{(Equation 1)}$$

$$p_V = \frac{N_V}{N_H + N_V} \quad \text{(Equation 2)}$$

wherein $P_H$ and $P_V$ mean sampling probabilities in a horizontal text subset and a vertical text subset, respectively, $N_H$ and $N_V$ mean the numbers of remaining samples in the horizontal text subset and the vertical text subset, respectively, and as the drawn samples, all samples of two subsets are drawn by random sampling without replacement until training of one epoch is completed.

Meanwhile, another exemplary embodiment of the present invention provides a system of multi-directional scene text recognition based on multi-element attention mechanism, which includes: a feature extractor performing normalization processing for a text row/column image I output from an external text detection module, extracting a feature for the normalized image by using a deep convolutional neural network to acquire an initial feature map $F_0$, and adding a 2-dimensional directional positional encoding P to the initial feature map $F_0$ in order to output a multi-channel feature map F, wherein the size of the feature map F is $H_F \times W_F$, and the number of channels is D; an encoder modeling each element of the feature map F output from the feature extractor as a vertex of a graph, and implementing multi-element attention mechanisms of local, neighboring, and global through designing three adjacency matrices for the graph including a local adjacency matrix, a neighboring adjacency matrix, and a global adjacency matrix to convert the multi-channel feature map F into a hidden representation H; and a decoder converting the hidden representation H output from the encoder into recognized text and setting the recognized text as an output result.

The feature extractor includes a normalization module performing the normalization processing for the text row/column image I output from the external text detection module, a CNN module extracting a feature for the normalized image by using a deep convolutional neural network to acquire the initial feature map $F_0$, and a positional encoding module adding a 2D directional positional encoding P to the initial feature map $F_0$ in order to output the multi-channel feature map F.

The normalization module determines whether the text row/column image I is a horizontal or vertical text according to the width and height of the text row/column image I output from the external text detection module, and sets a horizontal/vertical flag according to the determination result, and when the height of the text row/column image I is larger than γ times of the width of the text row/column image I, and sets the horizontal/vertical flag to 0 which is corresponding to vertical text, and when the height of the text row/column image I is equal to or smaller than γ times of the width of the text row/column image I, and sets the horizontal/vertical flag to 1 which is corresponding to horizontal text, and sets γ to a constant number of 1.5, sets the image normalization width $W_I$ to 256, and sets the height $H_I$ to 64 in the case of the horizontal text, and sets the image normalization width $W_I$ to 64, and sets the height $H_I$ to 256 in the case of the vertical text, and a bilinear interpolation method is used for the image normalization.

The CNN module outputs the initial feature map $F_0$ in which the size is $H_F \times W_F$ and the number of channels is D through the deep convolutional neural network, and the deep convolutional neural network includes a total of 7 convolution blocks of the first to seventh convolution blocks, and the size of the feature map output from the third convolution block is $H_F \times W_F$, the number of channels is $D_3$, the size of the feature map output from the fifth convolution block is $$\frac{H_F}{2} \times \frac{W_F}{2},$$

and the number of channels is $D_5$, and the size of the feature map output from the seventh convolution block is $$\frac{H_F}{4} \times \frac{W_F}{4},$$

and the number of channels is D, and the feature map output from the seventh convolution block after the upsampling operation is added to the output result acquired by passing the output of the fifth convolution block through a 1×1 convolution with the channel number of D, and the acquired result after the upsampling operation is added to the output result acquired by passing the output of the third convolution block through a 1×1 convolution with the channel number of D, then the initial feature map $F_0$ is acquired through one 1×1 convolution with the channel number of D, and the deep convolutional neural network is a U-shaped structure deep convolutional neural network, and the adopted backbone network is EfficientNet-B3.

When the horizontal/vertical flag is 1, the positional encoding P is $P_{(i,j,2k)}=\sin(j/T^{2k/D})$, and $P_{(i,j,2k+1)}=\cos(j/T^{2k/D})$, and when the horizontal/vertical flag is 0, the positional encoding P is $P_{(i,j,2k)}=\sin(i/T^{2k/D})$, and $P_{(i,j,2k+1)}=\cos(i/T^{2k/D})$, the positional encoding module acquires a multi-channel feature map F in which $F=F_0+P$ by adding the positional encoding P and the initial feature map $F_0$, and wherein (i, j) means an i-th row, j-th column location in the initial feature map $F_0$, k represents the index channel number of the initial feature map $F_0$, D means the number of channels of the initial feature map $F_0$, and T represents a predetermined constant number.

The encoder is constituted by two identical encoding unit stacks, and each encoding unit includes a local attention module $\text{MEA}_{Local}$, a neighboring attention module $\text{MEA}_{Neighbor}$, and a global attention module $\text{MEA}_{Global}$, and a feed forward network module, and decomposes the elements of the multi-channel feature map F to a vector according to column order, and obtains a feature matrix X, and the dimension of the feature matrix X is N×D, i.e., an N-row and D-column matrix, the N represents the number of elements of each channel, $N=H_F \times W_F$, and D represents the number of channels of the feature map F.

The calculation of the multi-element attention mechanism is represented by $$MEA(X) = \text{softmax}\left(\frac{AXW_Q W_K^T X^T B^T}{\sqrt{D}}\right) XW_V,$$

and here, $W_Q$, $W_K$, and $W_V$ are parameter matrices, each dimension is D×D, adjacency matrices A and B are used for modeling the spatial correlation of the feature after mapping by $W_Q$ and $W_K$, and the dimension is N×N.

In the local attention module $\text{MEA}_{Local}$, the adjacency matrices A and B are identity matrices, in the neighboring attention module $\text{MEA}_{Neighbor}$, the adjacency matrices A and B have the save form as a circulant matrix which is subjected to a convolution operation for the feature map F by using a convolution kernel with the size of k×k and all 1s as the element values, and wherein, a value of k is smaller than the width and the height of the feature map F, and in the global attention module $MEA_{Global}$, values of the adjacency matrices A and B are randomly initialized, and trained with the entire network, in respect to calculation of $AXW_Q$ and $W_K^T X^T B^T = (BXW_K)^T$, two fully connected layers are respectively used on the feature vector dimension and the channel dimension, adjacency matrices A and B are implemented by using a 1-dimensional convolution operation in which the size of the convolution kernel is 1×1, and the number of channels is N, and parameter matrices $W_Q$ and $W_K$ are implemented by using a 1-dimensional convolution operation in which the size of the convolution kernel is 1×1, and the number of channels is D.

A calculation process of the hidden representation H is H=LN(Z+FFD(Z)), wherein LN means a layer normalization operation, and Z+FFD(Z) means a residual connection, a calculation process of a feed forward network module is $FFD(Z)=conv_2(\varphi(conv_1(Z)))$, $conv_1$ and $conv_2$ denote multi-channel 1-dimensional convolutions with the kernel size of 1×1, and φ represents an activation function of a Gaussian error linear unit (GELU), and the calculation process of Z is $Z=conv_3(Y_1)\|conv_4(Y_2)\|conv_5(Y_3)$ $Y_1=LN(X+MEA_{Local}(X))$ $Y_2=LN(X+MEA_{Neighbor}(X))$ $Y_3=LN(X+MEA_{Global}(X))$, and wherein $conv_3$, $conv_4$, and $conv_5$ are 1×1 convolution operations in which the number of channels is D/3, where D is the channel number of the original feature maps, the symbol "$\|$" means a channel-dimension concatenation operation, $MEA_{Local}$, $MEA_{Neighbor}$, and $MEA_{Global}$ mean a local attention module, a neighboring attention module, and a global attention module, respectively, and $X+MEA_{Local}(X)$, $X+MEA_{Neighbor}(X)$, and $X+MEA_{Global}(X)$ are residual connections.

The decoder is a bidirectional structure including a forward decoder and a backward decoder, and the forward decoder recognizes a text image in the same direction as a reading order and the backward decoder recognizes the text image in the opposite direction to the reading order, the decoder of each direction includes two identical decoding units, and each decoding unit includes one self-attention layer, one encoder-decoder attention layer, and one feed forward network module, the dimension output in each step of the decoder is converted into a dimension of a character set size by using one fully connected layer, and then a likelihood value of the character output in each step is acquired through a softmax function, and a log likelihood value is acquired by taking a log operation, and for the input text row/column image I, each of the forward decoder and the backward decoder outputs one recognition result, in which the recognition result with higher log likelihood value is selected as the final recognition result, and the recognition result log likelihood value is the average value of all character log likelihood values in a text sequence.

An input of the decoder includes two parts, the first part is hidden representations output from the encoder, the second part is the text ground-truth in the training stage, or the recognition text output from the decoder in the test stage, the character sequence of the second part input is gradually converted into the vector through character embedding, and processed by the self-attention layer, and then sent to the encoder-decoder attention layer together with the first part input, and the acquired result is input into the feed forward network module to acquire a decoder output, in the training stage, mask processing is introduced into the decoder self-attention layer, and only the current character and the previous text ground-truth are used when calculating the attention score, in the training stage, the cross entropy of the recognized text and the text ground-truth is set as the objective function, and optimization is performed for parameters of the entire network including the feature extractor, the encoder, and the decoder, and in the training stage, horizontal scene text and vertical scene text training data are divided into two subsets according to the direction, and data of each iteration are drawn from two subsets according to Equations 3 and 4 below when training, $$p_H = \frac{N_H}{N_H + N_V} \quad \text{(Equation 3)}$$

$$p_V = \frac{N_V}{N_H + N_V} \quad \text{(Equation 4)}$$

wherein $P_H$ and $P_V$ mean sampling probabilities in a horizontal text subset and a vertical text subset, respectively, $N_H$ and $N_V$ mean the numbers of remaining samples in the horizontal text subset and the vertical text subset, respectively, and as the drawn samples, all samples of two subsets are drawn by random sampling without replacement until training of one epoch is completed.

According to an exemplary embodiment of the present invention, in the training stage, only a text ground-truth corresponding to a text row/column image input as a sequence label is required, and location information of each character need not be labeled for the image. According to an exemplary embodiment of the present invention, a high recognition performance can be acquired on multi-oriented scene texts and inclined/curved irregular scene texts.

BRIEF DESCRIPTION OF THE DRAWINGS

Hereinafter, exemplary embodiments of the present invention will be described with reference to the accompanying drawings. For clarity, the same or similar sign is used to represent the same or similar elements in the drawings. The accompanying drawings are just exemplary, and elements to be described are not particularly drawn according to a ratio.

FIG. 8 is a schematic view of element-wise permutation relationship of stroke pixels.

FIG. 9 illustrates some recognition results according to an exemplary embodiment of the present invention.

DETAILED DESCRIPTION OF THE EMBODIMENTS

Hereinafter, an exemplary embodiment of the present invention will be described by using the accompanying drawings, and in the accompanying drawings, the same or similar sign is used to represent the same or similar elements or devices having the same or similar function. Hereinafter, the exemplary embodiment described by using the accompanying drawings is exemplary, and is used for describing the present invention, and should not be construed as a limitation for the present invention.

Figure 1:
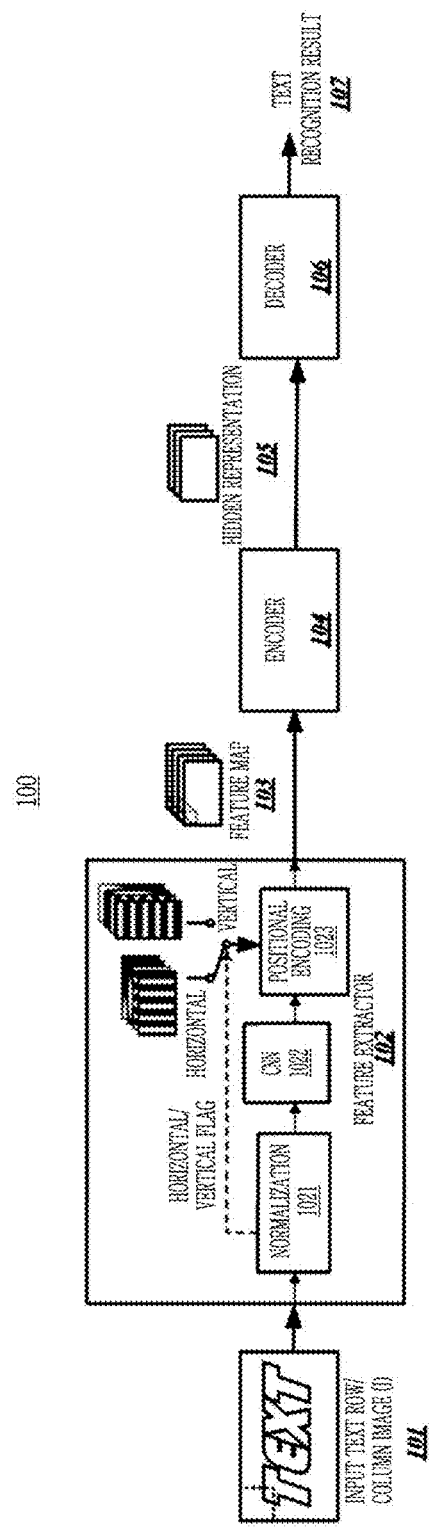
FIG. 1 is a flowchart of the method of multi-directional scene text recognition based on multi-element attention mechanism according to an exemplary embodiment of the present invention.

FIG. 1 is a flowchart of a method of multi-directional scene text recognition based on multi-element attention mechanism 100 according to an exemplary embodiment of the present invention. The exemplary embodiment of the present invention is implemented by a computer with a single NVIDIA Tesla V100 GPU, and a PyTorch machine learning framework is used.

As illustrated in FIG. 1, the method of multi-directional scene text recognition based on multi-element attention mechanism 100 according to an exemplary embodiment of the present invention includes a feature extractor 102, an encoder 104, and a decoder 106. A text row/column image 101 output from an external text detection module at the front end of the system is input into the feature extractor 102.

The feature extractor 102 according to an exemplary embodiment of the present disclosure may be a processor (e.g., computer, microprocessor, CPU, ASIC, circuitry, logic circuits, etc.). The feature extractor 102 may have an associated non-transitory memory storing software instructions, e.g., a program(s), software instructions reproducing algorithms, etc., which, when executed by the processor of the feature extractor 102, performs normalization processing for the input text row/column image 101, extracts an initial multi-channel feature map by using a deep convolutional neural network (CNN), and adds a 2-dimensional positional encoding to the initial multi-channel feature map, and then outputs a multi-channel feature map F 103. Herein, the memory and the processor may be implemented as separate semiconductor circuits. Alternatively, the memory and the processor may be implemented as a single integrated semiconductor circuit. The processor may embody one or more processor(s).

The feature extractor 102 may include a normalization module 1021, a CNN module 1022, and a positional encoding module 1023.

The normalization module 1021 according to an exemplary embodiment of the present disclosure may be a processor (e.g., computer, microprocessor, CPU, ASIC, circuitry, logic circuits, etc.). The normalization module 1021 may have an associated non-transitory memory storing software instructions, e.g., a program(s), software instructions reproducing algorithms, etc., which, when executed by the processor of the normalization module 1021, may perform normalization processing for text row/column image I output from an external text detection module. Herein, the memory and the processor may be implemented as separate semiconductor circuits. Alternatively, the memory and the processor may be implemented as a single integrated semiconductor circuit. The processor may embody one or more processor(s).

The CNN module 1022 according to an exemplary embodiment of the present disclosure may be a processor (e.g., computer, microprocessor, CPU, ASIC, circuitry, logic circuits, etc.). The CNN module 1022 may have an associated non-transitory memory storing software instructions, e.g., a program(s), software instructions reproducing algorithms, etc., which, when executed by the processor of the CNN module 1022, extracts a feature for the normalized image by using the deep convolutional neural network to acquire an initial feature map $F_0$. Herein, the memory and the processor may be implemented as separate semiconductor circuits. Alternatively, the memory and the processor may be implemented as a single integrated semiconductor circuit. The processor may embody one or more processor(s).

The positional encoding module 1023 according to an exemplary embodiment of the present disclosure may be a processor (e.g., computer, microprocessor, CPU, ASIC, circuitry, logic circuits, etc.). The positional encoding module 1023 may have an associated non-transitory memory storing software instructions, e.g., a program(s), software instructions reproducing algorithms, etc., which, when executed by the processor of the positional encoding module 1023, adds a 2-dimensional positional encoding P to the initial feature map $F_0$ in order to output the multi-channel feature map F. Herein, the memory and the processor may be implemented as separate semiconductor circuits. Alternatively, the memory and the processor may be implemented as a single integrated semiconductor circuit. The processor may embody one or more processor(s).

The encoder 104 according to an exemplary embodiment of the present disclosure may be a processor (e.g., computer, microprocessor, CPU, ASIC, circuitry, logic circuits, etc.). The encoder 104 may have an associated non-transitory memory storing software instructions, e.g., a program(s), software instructions reproducing algorithms, etc., which, when executed by the processor of the encoder 104, models the correlation between respective areas of the image, and encodes the extracted feature into a hidden representation 105. Herein, the memory and the processor may be implemented as separate semiconductor circuits. Alternatively, the memory and the processor may be implemented as a single integrated semiconductor circuit. The processor may embody one or more processor(s).

The decoder 106 according to an exemplary embodiment of the present disclosure may be a processor (e.g., computer, microprocessor, CPU, ASIC, circuitry, logic circuits, etc.). The decoder 106 may have an associated non-transitory memory storing software instructions, e.g., a program(s), software instructions reproducing algorithms, etc., which, when executed by the processor of the decoder 106, recursively generates a prediction text result 107 by using an output of the encoder 104. In the training stage according to the exemplary embodiment of the present invention, only the text ground-truth corresponding to the text row/column image input as a sequence label is required, and location information of each character need not be labeled for the image.

Specifically, the input text row/column image 101 is an RGB 3-channel color image. The input text row/column image 101 may be generally output by a scene text detection module at the front end of the system or acquired by another scheme. The feature extractor 102 performs the normalization processing for the input text row/column image 101, specifically distinguishes whether the input text row/column image 101 is a horizontal text or a vertical text according to the width and the height of the input text row/column image 101, and sets the horizontal/vertical flag according to the distinguishing result. When the height of the input text row/column image 101 is γ times larger than the width of the input text row/column image 101, the input text row/column image 101 may be determined as vertical text, and in this case, the horizontal/vertical flag is set to 0. Otherwise, the input text row/column image 101 is determined as horizontal text and in this case, the horizontal/vertical flag is set to 1. And γ may be set to a constant number of 1.5 or other appropriate values.

The normalization module 1021 of the feature extractor 102 may perform the normalization processing for the input text row/column image 101, and an image normalization width is set to $W_I$ and an image normalization height is set to $H_I$. For different images, the normalization width $W_I$ and height $H_I$ are set to different values according to horizontal and vertical directions so as to maintain a horizontal/vertical image layout.

The CNN module 1022 extracts the feature for the normalized image by using the deep convolutional neural network to acquire an initial feature map $F_0$, and the width of the initial feature map $F_0$ is $W_F$, the height of the initial feature map $F_0$ is $H_F$, and the number of channels is D.

Figure 2:
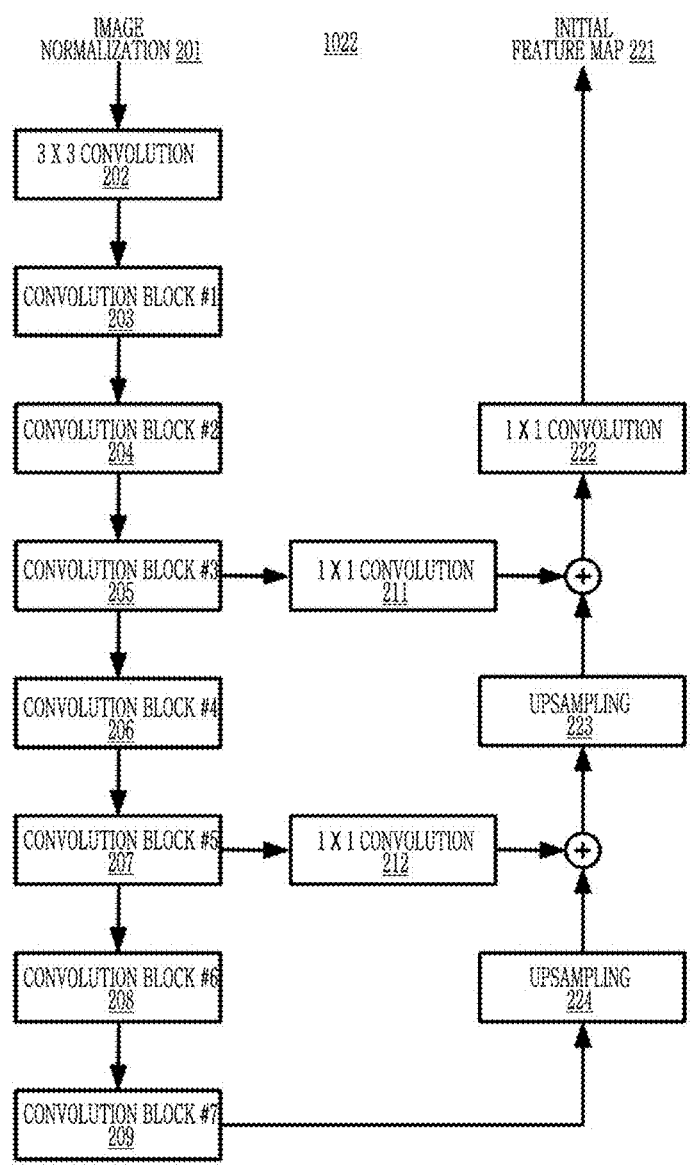
FIG. 2 is a structural diagram of the convolutional neural network in the feature extractor in the method of multi-directional scene text recognition based on multi-element attention mechanism according to an exemplary embodiment of the present invention.

FIG. 2 is a structural diagram of a convolutional neural network in the feature extractor in the method of multi-directional scene text recognition based on multi-element attention mechanism according to an exemplary embodiment of the present invention. As illustrated in FIG. 2, the convolutional neural network in the feature extractor 102 according to the exemplary embodiment of the present invention is a U-shaped structure CNN, and the adopted backbone network is EfficientNet-B3.

As illustrated in FIG. 2, a convolutional layer 202 and 7 Mobile Inverted Bottleneck (MBConv) convolution blocks 203 to 209 are an EfficientNet-B3 network structure. An output of a third convolution block 205 has 48 channels, and has a size of $H_F \times W_F$. An output of a fifth convolution block 207 has 136 channels, and has a size of $$\frac{H_F}{2} \times \frac{W_F}{2},$$

An output feature of a seventh convolution block 209 has 384 channels, and has a size of $$\frac{H_F}{4} \times \frac{W_F}{4}.$$

In the exemplary embodiment, the CNN module 1022 of the feature extractor 102 uses a U-shaped CNN structure design based on the EfficientNet-B3 network structure, and the outputs of the third convolution block 205 and the fifth convolution block 207 are converted to have 384 channels by using 2 1×1 convolution layers 211 and 212.

The output of the seventh convolution block 209 after the upsampling operation 224 is added to the output result acquired by passing the output of the fifth convolution block 207 through the 1×1 convolution layer 212, and the acquired result after the upsampling operation 223 is added to the output result acquired by passing the output of the third convolution block 205 through the 1×1 convolution layer 211. At last, the initial feature map $F_0$ 221 is acquired through one 1×1 convolution operation 222. Here, a symbol "⊕" means an addition.

For example, in the case of the horizontal text, the normalization size of an input text row image is 64×256×3, and here, the image normalization width is 256 and the image normalization height is 64, and the number of channels is 3, the size of the feature map output from the feature extractor is 8×32×384, and here, the feature map has the width of 32, the height of 8, and the number of channels of 384.

In respect to the vertical text, the normalization size of an input text column image is 256×64×3 and the size of the feature map output from the feature extractor is 32×8×384.

The positional encoding module 1023 uses a directional positional encoding P for introducing directional information into the image for the initial feature map $F_0$ extracted by a CNN. In general, a reading order of the horizontal text is from left to right, and the reading order of the vertical text is from top to bottom. In the exemplary embodiment, a direction is coded by using the width of a horizontal image and the height of a vertical image.

In the specific coding scheme, when the horizontal/vertical flag is 1 which is corresponding to horizontal text, the positional encoding is $$P_{(i,j,2k)} = \sin(j/T^{2k/D})$$

$$P_{(i,j,2k+1)} + \cos(j/T^{2k/D}).$$

When the horizontal/vertical flag is 0 which is corresponding to vertical text, the positional encoding is $$P_{(i,j,2k)} = \sin(i/T^{2k/D})$$

$$P_{(i,j,2k+1)} + \cos(i/T^{2k/D}).$$

Here, (i, j) means the i-th row, j-th column location in the initial feature map $F_0$, k means a feature map channel number, D means the total number of feature map channels, T represents a predetermined constant number, P represents the acquired positional encoding result and has the same size as the initial feature map $F_0$. In an example, D may be 384 and T may be 64.

A feature map F is acquired into which directional positional encoding information is introduced by adding the positional encoding P and the initial feature map $F_0$, and therefore, the multi-channel feature map F 103 is $F=F_0+P$.

The encoder 104 calculates the hidden representation by using the multi-element attention mechanism for the multi-channel feature map F 103 output from the feature extractor 102. The encoder 104 models each element in the multi-channel feature map F 103 as a vertex of a graph. Further, the encoder 104 converts an input feature map into a hidden representation by implementing local, neighboring, and global multi-element attention mechanisms through designing three adjacency matrices for the graph including local, neighboring, and global adjacency matrices.

The neural network structure of the encoder 104 is constituted by two identical encoding unit stacks, and each encoding unit includes three multi-element attention modules such as a local attention module, a neighboring attention module, and a global attention module, and one feed forward network module.

Specifically, the encoder 104 first decomposes the elements of the feature map F to a vector according to column order, and obtains an feature matrix X having the dimension of N×D, i.e., an N-row and D-column matrix. Here, N represents the number of respective channel elements, $N=H_F \times W_F$ and D represents the number of channels of the feature map.

The multi-element attention mechanism models N feature vectors of the feature matrix X as N vertexes of a graph and represents a relationship between elements by using an adjacency matrix of the graph. Three different types of adjacency matrices including the local, neighboring, and global adjacency matrices are applied to the feature vectors, respectively, in order to calculate local, neighboring, and global attention coefficients. The local, neighboring, and global attention coefficients are used as weights for the feature vectors. An intermediate output using three different attention mechanisms is processed by dimension compression and concatenation to acquire a hidden representation having the same dimension as that of an input feature map F 103 of the encoder 104.

The calculation model of the multi-element attention mechanism is uniformly formulated as $$MEA(X) = \text{softmax}\left(\frac{AXW_Q W_K^T X^T B^T}{\sqrt{D}}\right) X W_V.$$

Here, $W_Q$, $W_K$, and $W_V$ are three parameter matrices having a dimension of D×D. The adjacency matrices A and B are used for modeling a spatial correlation of a feature after mapping by $W_Q$ and $W_K$, and have a dimension of N×N. The adjacency matrices A and B may be determined in advance and obtained by network learning.

According to different values of elements in adjacency matrices A and B, multi-element attention has various formats including a local attention $MEA_{Local}$, a neighboring attention $MEA_{Neighbor}$, and a global attention $MEA_{Global}$. Among them, (i) Local attention $MEA_{Local}$: Both A and B are identity matrices, and the local attention is the same as self attention.

(ii) Neighboring attention $MEA_{Neighbor}$: The adjacency matrices A and B have the save form as a circulant matrix which is subjected to a convolution operation for the feature map F by using a convolution kernel with the size of k×k and all 1s as the element values. Here, the value of k is smaller than the width and the height of the feature map. For example, k may be set to 3.

In the case of the local attention and the neighboring attention, the adjacency matrix A and the parameter matrix $W_Q$ are applied to the feature matrix X (i.e., $AXW_Q$ of the above equation), A and $W_Q$ may be merged, and the size of the convolution kernel is k×k, the number of channels is D, and a convolution computation is performed for the feature map F by using a convolution kernel with the stride as 1. When k=1, the attention is the local attention and when k>1, the attention is the neighboring attention. The calculation of $W_K^T X^T B^T = (BXW_K)^T$ is similar to $AXW_Q$.

(iii) Global attention $MEA_{Global}$: The adjacency matrices A and B are randomly initialized, and trained with the entire network, and the calculation of $AXW_Q$ and $W_K^T X^T B^T = (BXW_K)^T$ may be regarded as calculating two fully connected layers along with the feature vector dimension and the channel dimension, respectively. The adjacency matrices A and B are implemented by using a 1-dimensional convolution in which the size of the convolution kernel is 1×1 and the number of channels is N. Parameter matrices $W_Q$ and $W_K$ are implemented by using a 1-dimensional convolution operation in which the size of the convolution kernel is 1×1 and the number of channels is D.

The calculation process of the hidden representation H is H=LN(Z+FFD(Z)).

Here, LN means a layer normalization operation, and Z+FFD(Z) means a residual connection.

FFD means a feed forward network module with the calculation process $FFD(Z) = \text{conv}_2(\varphi(\text{conv}_1(Z)))$.

Here, $\text{conv}_1$ and $\text{conv}_2$ a multi-channel 1×1 and 1-dimensional convolution task, and $\varphi$ represents an activation function of a Gaussian error linear unit (GELU).

The calculation process of Z is, $Z = \text{conv}_3(Y_1) \| \text{conv}_3(Y_2) \| \text{conv}_3(Y_3)$ $Y_1 = LN(X + MEA_{Local}(X))$ $Y_2 = LN(X + MEA_{Neighbor}(X))$ $Y_3 = LN(X + MEA_{Global}(X))$ Here, $\text{conv}_3$, $\text{conv}_4$, and $\text{conv}_5$ are 1×1 convolution operations in which the number of channels is D/3, thus compress the number of data channels D into its ⅓. The symbol "∥" means a concatenation operation. $MEA_{Local}$, $MEA_{Neighbor}$, and $MEA_{Global}$ mean 3 multi-element attention modules including the local attention module, the neighboring attention module, and the global attention module, and $X + MEA_{Local}(X)$, $X + MEA_{Neighbor}(X)$, and $X + MEA_{Global}(X)$ are residual connections.

Figure 3:
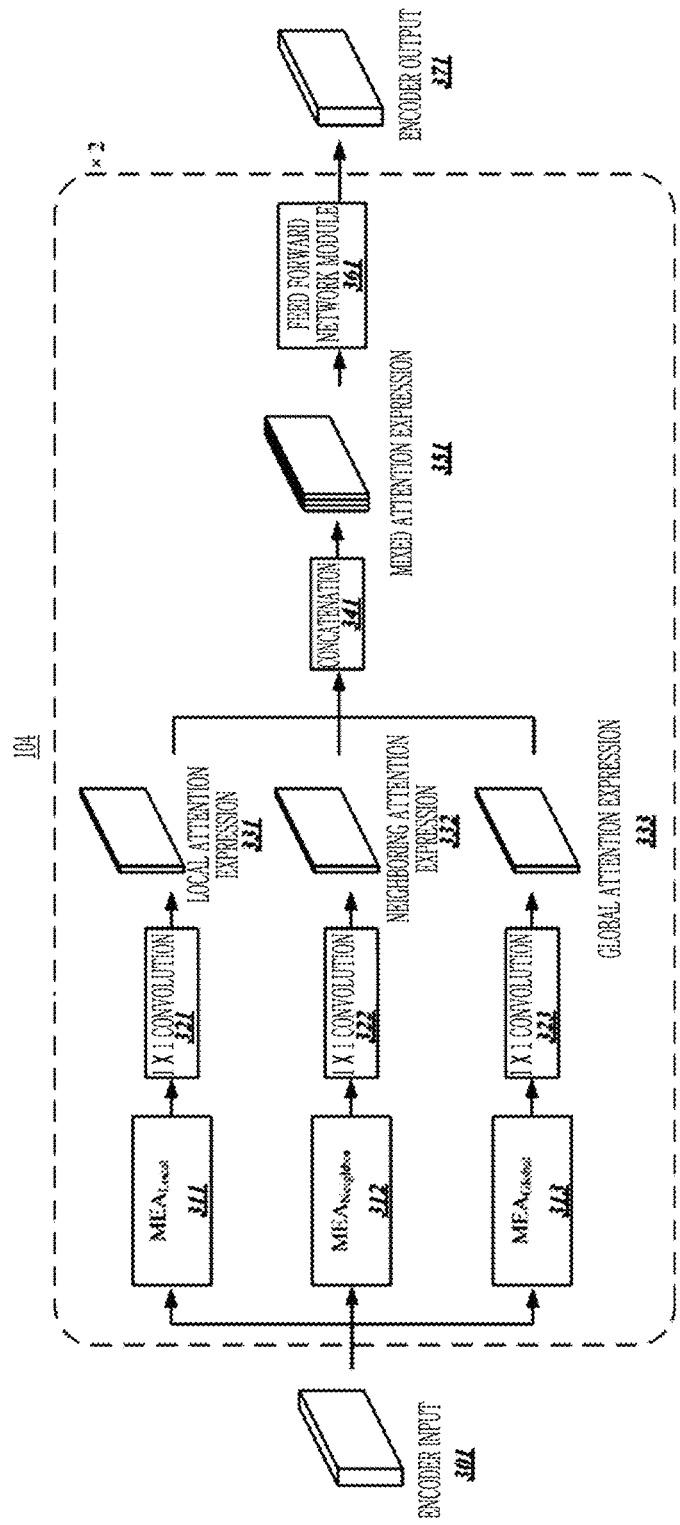
FIG. 3 is a structural diagram of the encoder in the method of multi-directional scene text recognition based on multi-element attention mechanism according to an exemplary embodiment of the present invention.

FIG. 3 is a structural diagram of the encoder in the method of multi-directional scene text recognition based on multi-element attention mechanism according to an exemplary embodiment of the present invention.

As illustrated in FIG. 3, the encoder according to the exemplary embodiment of the present invention is formed by two identical encoding units, and each encoding unit includes three multi-element attention (MEA) modules, $MEA_{Local}$ 311, $MEA_{Neighbor}$ 312, and $MEA_{Global}$ 313, and one feed forward network module 361.

The $MEA_{Local}$ 311 focuses on local information when calculating an attention score through a 1×1 convolution, the $MEA_{Neighbor}$ 312 focuses on neighboring information when calculating the attention score through a 3×3 convolution, and the $MEA_{Global}$ 313 focuses on global information when calculating the attention score through a graph convolution.

By applying 1×1 convolution layers 321 to 323 to the outputs of three MEA layers respectively, the channel number D is compressed into its ⅓, and three outputs 331 to 333 are obtained. The obtained local attention expression 331, neighboring attention expression 332, and global attention expression 333 are processed by channel-dimension concatenation 341 to form a mixed attention expression 351. At last, the feed forward network module 361 is used to enhance the non-linear expression capability of the hidden representation.

Figure 4:
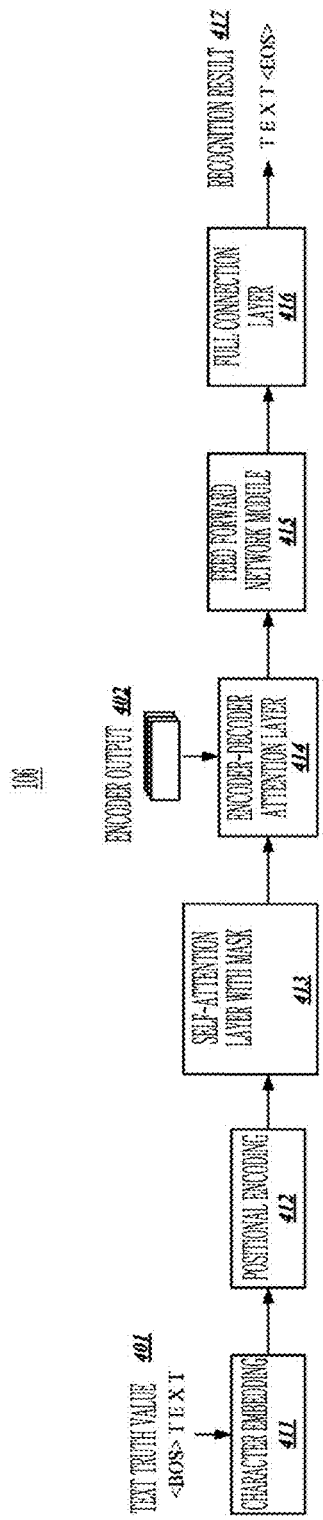
FIG. 4 is a schematic view of the decoder when training a model in the method of multi-directional scene text recognition based on multi-element attention mechanism according to an exemplary embodiment of the present invention.
Figure 5:
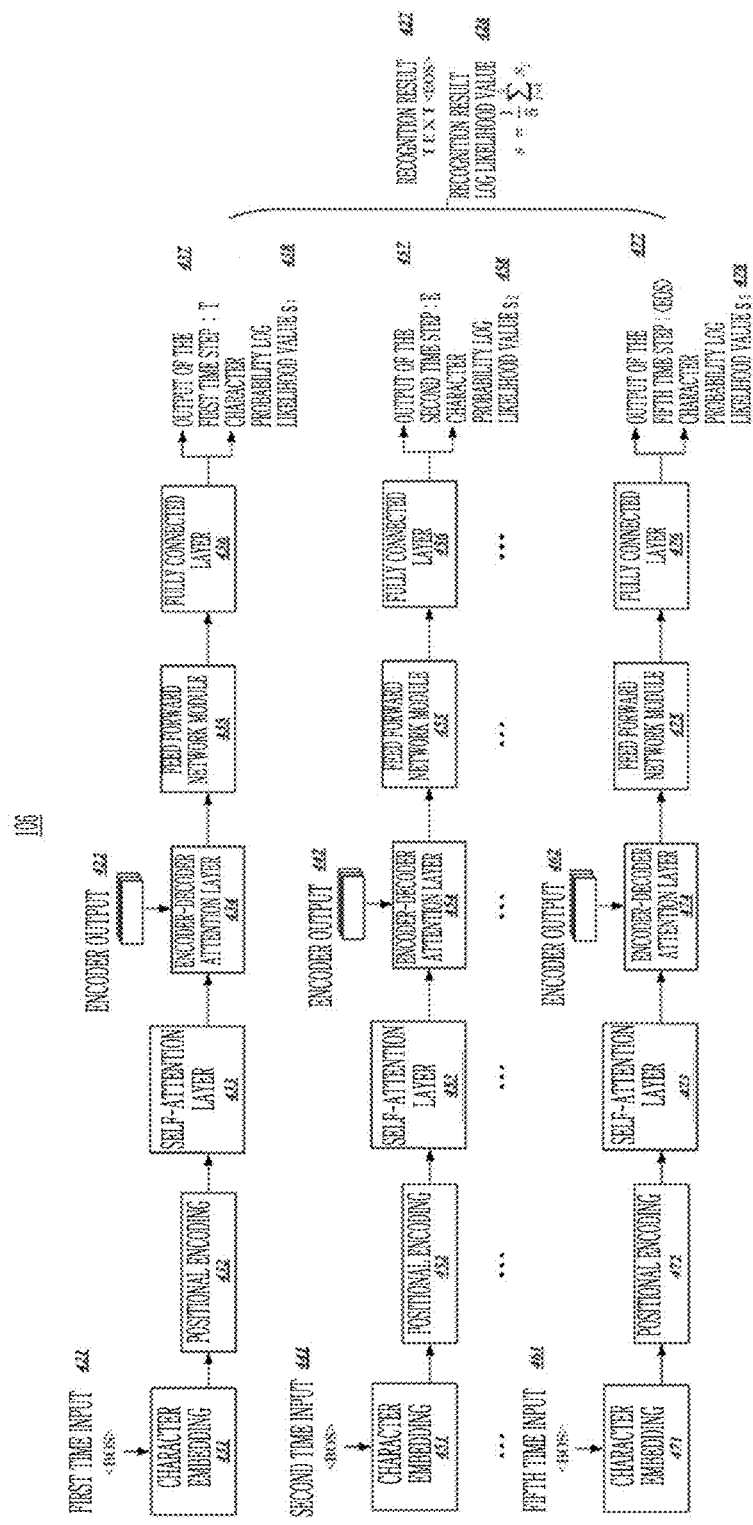
FIG. 5 is a schematic view of the decoder when a trained model recognizes a text image in the method of multi-directional scene text recognition based on multi-element attention mechanism according to an exemplary embodiment of the present invention.
Figure 6:
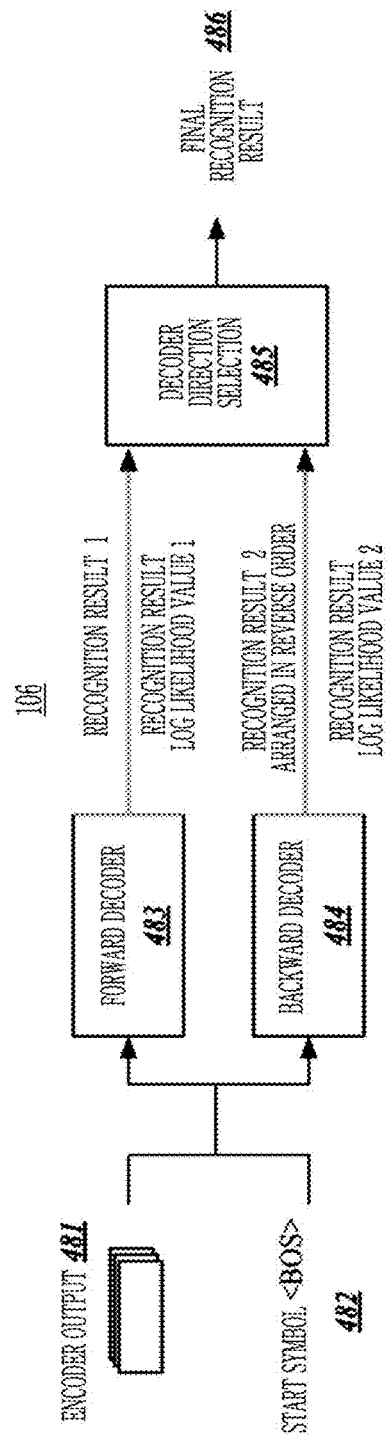
FIG. 6 is a schematic view of the bi-directional decoder in the method of multi-directional scene text recognition based on multi-element attention mechanism according to an exemplary embodiment of the present invention.

FIG. 4 is a schematic view of a decoder when training a model in the method of multi-directional scene text recognition based on multi-element attention mechanism according to an exemplary embodiment of the present invention. FIG. 5 is a schematic view of a decoder when a trained model recognizes a text image in the method of multi-directional scene text recognition based on multi-element attention mechanism according to an exemplary embodiment of the present invention. FIG. 6 is a schematic view of a bi-directional decoder in the method of multi-directional scene text recognition based on multi-element attention mechanism according to an exemplary embodiment of the present invention.

The decoder 106 according to the exemplary embodiment of the present invention is a bidirectional structure and may recursively generate recognition results using the hidden representation 105 output from the encoder 104. As illustrated in FIG. 6, the decoder includes a forward decoder 483 and a backward decoder 484, and here, the forward decoder 483 may recognize a text image in the same direction as the reading order and the backward decoder 484 may recognize the text image in the opposite direction to the reading order.

The decoder of each direction includes two identical decoding units.

Referring to FIG. 4, the decoding unit includes one self-attention layer 413, one encoder-decoder attention layer 414, and one feed forward network module 415. At last one fully connected layer 416 is used for converting the dimension of the output of each step of the decoder into an $N_C$ dimension. Here, $N_C$ represents a size of a character set, and a likelihood value of the character output in each step may be obtained through a softmax function, and a log likelihood value may be obtained by taking a log operation. The log likelihood value 428 of a recognition result is the average value of all symbol log likelihood values in a text sequence.

In the training stage, the cross entropy of the recognized text and the text ground-truth is set as the objective function, optimization is performed for parameters of the entire network model including the feature extractor, the encoder, and the decoder, and the forward decoder and the backward decoder are optimized simultaneously.

In the test stage, in the process 485 of selecting bidirectional decoding, the recognition result 486 of a decoder in a specific direction in which the log likelihood value of the text sequence recognition result is larger is set as the system output.

Further, a decode input includes two parts, the first part is hidden representations 402, 422, 442, . . . 462 output from the encoder, and the second part is the text ground-truth in the training stage, and is the predicted text which the decoder has already output in the test stage. It should be noted that, in the training stage, mask processing is introduced into the self-attention layer 413 to use only the current character and the previous text ground-truth when calculating the attention score. After a mask operation, the decoder may be simulated to gradually use character information already output in the test stage, and the training efficiency can be enhanced with parallel decoding in the training stage.

In the training stage, as illustrated in FIG. 4 (the forward decoder is described as an example), when the text ground-truth "TEXT" 401 is described as an example, the decoder input is "<BOS>TEXT", and here, "<BOS>" 482 means the start symbol, the output of the decoder is expected as "TEXT<EOS>" 417, and here, "<EOS>" means the end symbol.

Referring to FIG. 5, in the test stage, the decoder input at the first time is the start symbol "<BOS>" and at the second time step, the text ground-truth is substituted by using the recognition text output from the decoder. The start symbol and the recognized text are converted into the vector representations through character embeddings 431, 451, . . . 471 and processed through the positional encodings 432, 452, . . . 472 and the self-attention layers 433, 453, . . . 473, respectively, and then transmitted to the encoder-decoder attention layers 434, 454, . . . 474 together with the encoder outputs 422, 442, . . . 462. Thereafter, recognition text results 437, 457, . . . 477 and character probability log likelihood values 438, 458, . . . 478 are output through processing of the feed forward network modules 435, 455, . . . 475 and fully connected layers 436, 456, . . . 476, respectively.

As illustrated in FIG. 5 (the forward decoder is described as an example), when the text ground-truth "TEXT" is described as an example, at the first time step 421, the decoder first inputs the start symbol "<BOS>" and decodes the first character "T" 437.

At the second time step 441, the decoder inputs the start symbol and a recognition result "<BOS>T" of the previous time step, and decodes a second character "E" 457.

The decoder recursively decodes the end symbol "<EOS>" 477 by repeating the step until the end symbol "<EOS>" 477 is decoded.

In the training stage, horizontal scene text and vertical scene text training data are divided into two subsets according to its orientation, and data of each iteration are drawn from two subsets in the following scheme when training.

$$p_H = \frac{N_H}{N_H + N_V}$$

$$p_V = \frac{N_V}{N_H + N_V}$$

Here, $P_H$ and $P_V$ mean sampling probabilities in a horizontal text subset and a vertical text subset, respectively. $N_H$ and $N_V$ mean the numbers of remaining samples in the horizontal text subset and the vertical text subset, respectively. As drawn samples, all samples of two subsets are drawn by random sampling without replacement until training of one epoch is completed.

In the test stage, for the input text row/column image, each of the forward decoder and the backward decoder of the system outputs one recognition result, and the recognition result in which the log likelihood value is higher is selected as the finial recognition result 486. The log likelihood value 428 of the recognition result is the average value of all character log likelihood values 438, 458, . . . 478 in the text sequence.

[Table 1] shows the exemplary embodiment of the present invention and some recently reported scene text recognition methods. Word recognition accuracy is presented, which is acquired without using a dictionary to correct the recognition results in 7 commonly used public English scene text datasets IIIT5k, SVT, IC03, IC13, IC15, SVTP, and CUTE. In this experiment, the training set is MJSynth and SynthText which are two commonly used public synthetic scene text datasets. According to the experimental results, the exemplary embodiment of the present invention has achieved the highest recognition accuracy in each test set.

TABLE 1

| method | IIIT5k | SVT | IC03 | IC13 | IC15 | SVTP | CUTE |
| --- | --- | --- | --- | --- | --- | --- | --- |
| ASTER | 93.4% | 93.6% | 94.5% | 91.8% | 76.1% | 78.5% | 79.5% |
| MORAN | 91.2% | 88.3% | 95.0% | 92.4% | 68.8% | 76.1% | 77.4% |
| ACE | 82.3% | 82.6% | 92.1% | 89.7% | 68.9% | 70.1% | 82.6% |
| an exemplary embodiment of the present invention | 95.9% | 94.3% | 95.9% | 95.1% | 79.7% | 86.8% | 87.2% |

[Table 2] shows performance in a Chinese scene text recognition task according to the exemplary embodiment of the present invention, i.e., word recognition accuracy in the multi-directional Chinese scene text recognition task.

In the corresponding experiment, the training set includes 1,038,704 synthetic Chinese scene text images and 5000 real Chinese scene text images, and the ratio of horizontal and vertical texts is approximately 1:1. The test set includes 500 horizontal text images and 500 vertical text images. In the experiment, the word recognition accuracy of the exemplary embodiment of the present invention and the baseline system are compared. Among them, the baseline system and the exemplary embodiment of the present invention have the same feature extraction module, but the baseline system converts the 2D feature map into a 1D feature sequence by using a separate convolution layer and a downsampling layer, and uses a transformer as the encoder and the decoder.

In the baseline system, the vertical text image is rotated at 90 degrees counterclockwise, and then is normalized as a horizontal text image. In [Table 2], "horizontal training", "vertical training", and "horizontal and vertical trainings" mean training the model by using only horizontal samples, training the model by using only vertical samples, and training the model by using all samples, respectively.

TABLE 2

| | Baseline system | | | Exemplary embodiment of the present invention | | |
| --- | --- | --- | --- | --- | --- | --- |
| Test set | Horizontal training | Vertical training | Horizontal and vertical trainings | Horizontal training | Vertical training | Horizontal and vertical trainings |
| Horizontal test | 74.2% | — | 52.2% | 77.4% | — | 81.6% |
| Vertical test | — | 74.6% | 36.0% | — | 78.6% | 86.0% |

As seen through [Table 2], according to the exemplary embodiment of the present invention, when the dataset includes only the horizontal text or the vertical text, slightly higher accuracy may be obtained than the baseline system. When the dataset includes both the horizontal and vertical texts, a recognition rate of the baseline system is significantly reduced and the recognition rate according to the exemplary embodiment of the present invention is further enhanced. In the baseline system, a multi-directional text increases a pattern space which the model should learn. As a result, a lot of noise is introduced to decrease the recognition rate. The exemplary embodiment of the present invention may provide the same effect as increasing learning data without increasing the pattern space to be learned by learning the multi-directional text. Thus the generalization capability of the model is enhanced.

[Table 3] shows word recognition accuracy having different types of MEA models on multi-directional scene text datasets including Chinese, English, and the like. In this case, in the exemplary embodiment of the present invention, influences of different MEA mechanisms for the model performance are described.

In [Table 3], $MEA_{Local}$, $MEA_{Neighbor}$, $MEA_{Global}$, and $MEA_{Mix}$, are cases of using only $MEA_{Local}$, only $MEA_{Neighbor}$, only $MEA_{Global}$ for the encoder of the model, and only $MEA_{Mix}$, and a case of using three all MEAs, respectively.

TABLE 3

| | Chinese | | English | | |
| --- | --- | --- | --- | --- | --- |
| MEA type | Horizontal test | Vertical test | SVT | IC15 | SVTP |
| $MEA_{Local}$ | 80.2% | 83.2% | 93.5% | 77.3% | 86.5% |
| $MEA_{Neighbor}$ | 81.2% | 83.8% | 93.8% | 77.6% | 86.8% |
| $MEA_{Global}$ | 80.8% | 84.8% | 93.5% | 77.6% | 85.9% |
| $MEA_{Mix}$ | 81.6% | 86.0% | 94.3% | 79.7% | 86.8% |

As seen through [Table 3], $MEA_{Neighbor}$, $MEA_{Global}$, and $MEA_{Mix}$, may obtain better performance than $MEA_{Local}$ in the test set in most cases, and a system $MEA_{Mix}$ using three MEAs may acquire best performance in all test sets.

Figure 7:
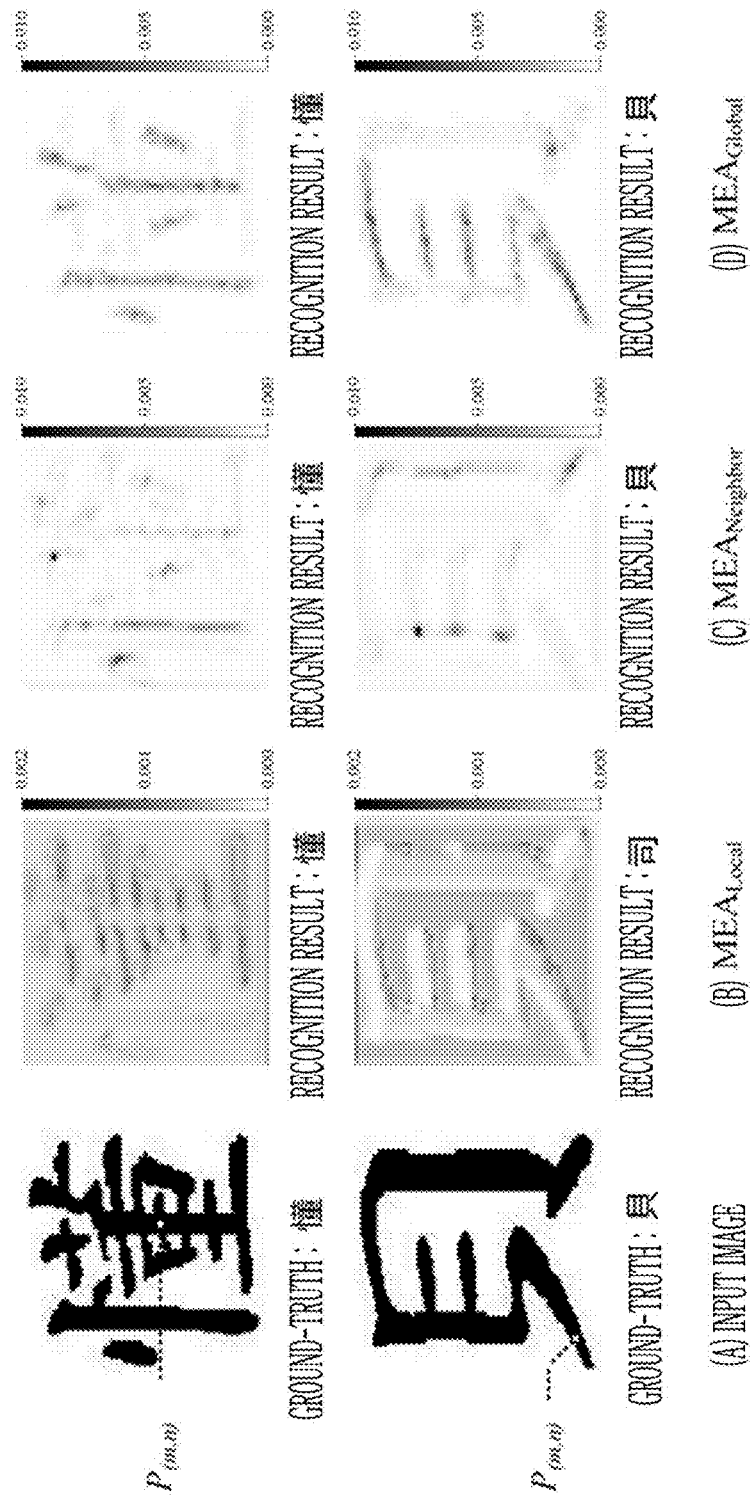
FIG. 7 shows heat maps of attention scores generated by various types of MEAs.

In FIG. 7, various types of MEAs are a heat map of an attention score $\alpha_{ij}$ (j=1,2, . . . ,N) generated for a single character, and here, 1, 2, . . . , N represent a subscript after an element in the feature map is developed to the vector according to the column. That is, a location (m, n) (m= 1, 2, . . . , $H_F$, n=1, 2, . . . , $W_F$) in the feature map corresponds to a vector subscript (n−1)×$H_F$+m. Here, a location $P_{(m, n)}$ of a white small block in the input image of FIG. 7A corresponds to a vector subscript i in an attention score $\alpha_{ij}$, and FIGS. 7B to 7D illustrate attention scores and recognition results generated by $MEA_{Local}$, $MEA_{Neighbor}$, and $MEA_{Global}$, respectively.

The attention score generated by $MEA_{Local}$ is relatively averagely distributed in the entire image, while the attention scores generated by $MEA_{Local}$ and the attention score generated by $MEA_{Neighbor}$ and $MEA_{Global}$ focuses on a fore front area of the text. This shows that the multi-element attention mechanism provided according to the present invention assists the model to focuses on features in the text area.

Further, the attention score of $MEA_{Neighbor}$ focuses on a small part of the foreground area, and the attention score by $MEA_{Global}$ focuses on most of a foreground area, and this shows that various types of MEAs are complementary.

Simultaneously, after $MEA_{Local}$ is introduced, an encoder-decoder $f_{EncDec}(\cdot)$ has a feature element permutation invariance and can be inferred as follows:

A case where one network model f has the permutation invariance indicates f(PX)=f(X), and here, P represents a permutation matrix in which the dimension is N×N that is, P is constituted only by 0 and 1. Further, $PP^T=P^TP=I$ is an identity matrix. X represents a feature matrix in which the dimension is N×D where there are N feature elements, and the dimension of each feature element is D, and PX means that the permutation matrix P acts on the feature matrix X, and N elements in X are re-arranged.

In the encoder in which $MEA_{Local}$ is introduced, $Z=MEA_{Local}(X)$ is set as an output of $MEA_{Local}$ and H is set as the output of the encoder, and a calculation process of an encoder $f_{Enc}(\cdot)$ is as follows.

$$Z = MEA_{Local}(X) = \text{softmax}\left(\frac{XW_Q W_K^T X^T}{\sqrt{D}}\right) XW_V$$

$$H = f_{Enc}(Z) = LN(FFD(Z) + Z)$$

In this case, it is considered that the permutation matrix P acts on the input feature matrix X as follows.

$$Z' = MEA_{Local}(PX) =$$
$$= \text{softmax}\left(\frac{PXW_Q W_K^T X^T P^T}{\sqrt{D}}\right) PXW_V$$
$$= P \cdot \text{softmax}\left(\frac{XW_Q W_K^T X^T}{\sqrt{D}}\right) P^T PXW_V$$
$$= P \cdot MEA_{Local}(X)$$
$$= PZ$$

$$H' = f_{Enc}(Z')$$
$$= LN(FFD(PZ) + PZ)$$
$$= P \cdot LN((FFD(Z) + Z))$$
$$= PH$$

In the above equation, a characteristic in which the softmax function has $\text{softmax}(PXP^T)=P\cdot\text{softmax}(X)\cdot P^T$ and the feed forward network module is $FFD(PZ)=P\cdot FFD(Z)$ are used. Accordingly, when the encoder input is a permutated feature matrix X'=PX, the output is a matrix H'=PH which goes through the same permutation operation.

The decoder used in the exemplary embodiment of the present invention includes one self-attention layer, one encoder-decoder attention layer, and one feed forward network module. When the training stage of the decoder is considered, if the text ground-truth converted into the vector through the character embedding and expressed is set to Y, the calculation process of the decoder $f_{Dec}(\cdot)$ is as follows.

$$G = SelfAttn(Y)$$

$$R = \text{softmax}\left(\frac{GW_Q W_K^T H^T}{\sqrt{d}}\right) HW_V$$

$$O = LN(FFD(R) + R)$$

Here, G represents the output of the self-attention layer, R represents the output of the encoder-decoder attention layer, and O represents the output of the feed forward network module. Since the text ground-truth Y is not related to an image feature level of disturbance, if the output of the encoder is H'=PH, the output of the decoder is as follows.

$$R' = \text{softmax}\left(\frac{GW_Q W_K^T H^T P^T}{\sqrt{D}}\right) PHW_V$$
$$= \text{softmax}\left(\frac{GW_Q W_K^T H^T}{\sqrt{D}}\right) P^T PHW_V$$
$$= \text{softmax}\left(\frac{GW_Q W_K^T H^T}{\sqrt{D}}\right) HW_V$$
$$= R$$

$$O' = LN(FFD(R') + R') = O$$

Accordingly, the output of the decoder is maintained without a change.

When the test stage of the decoder is considered, the second part input of the decoder at the first time step is always the start symbol <BOS>, and as a result, an output of the decoder at the first time step is maintained without the change according to the above inference. Simultaneously, when the second part input of the decoder at the t-th time step is maintained without change, the output of the decoder at the t-th time step is maintained without change according to the above inference. Accordingly, according to an induction method, in the test stage, the output of the decoder is not also affected by the encoder input permutation.

Consequently, after the encoder input feature matrix goes through the element permutation, the decoder output is $f_{EncDec}(PX)=f_{EncDec}(X)$ without change. Here, $f_{EncDec}(\cdot)$ is a function corresponding to an encoder-decoder network.

According to the above analysis, $MEA_{Local}$ has robustness for specific disturbance in terms of the feature.

Figure 8:
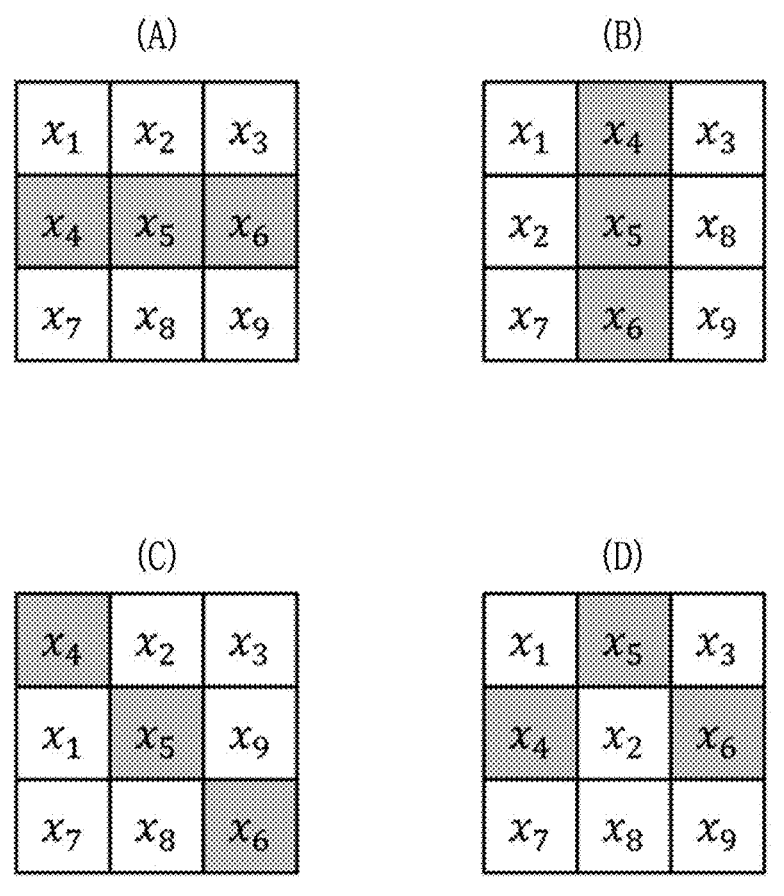

FIG. 8 is a schematic view of element-wise permutation relationship of stroke pixels. FIG. 8A illustrates a regular horizontal text, and the dark color block indicates one horizontal stroke. Through a permutation order "143258769", a vertical stroke of FIG. 8B may be obtained. Through a permutation order "423159786", a slope text stroke of FIG. 8C may be obtained. Through a permutation order "153426789", a curve text stroke of FIG. 8D may be obtained.

In the example of FIG. 8, the image is decomposed to a vector at element level, and then converted by using an appropriate permutation matrix P, and reconstructed into the image again, and the example of FIG. 8 shows that when the $MEA_{Local}$ encoder-decoder attention mechanism is used, the adaptive capability for various stroke arrangement directions may be obtained. According to the analysis, if $MEA_{Local}$ is used for the encoder, the model is robust for a slight disturbance of the character stroke, but simultaneously, the discrimination ability is weak for similar characters. Accordingly, when multi-element attention mechanisms such as $MEA_{Neighbor}$, $MEA_{Global}$, and $MEA_{Local}$ are used, the model may have both excellent character discrimination ability and robustness.

FIG. 9 illustrates some recognition results according to an exemplary embodiment of the present invention. Referring to FIG. 9, a method of multi-directional scene text recognition based on multi-element attention mechanism according to an exemplary embodiment of the present invention has an excellent recognition capability for all irregular scene texts constituting multi-directional scene texts, and slopes, and curves.

All steps or some step implementing the method exemplary embodiment may be implemented by hardware related to a program command. Program may be stored in a computer readable storage medium and when the program is executed, steps including the method exemplary embodiments are performed and the storage medium includes various media which can store a program code, such as a ROM, a RAM, a magnetic disk, or an optical disk.

Through the description of the exemplary embodiment, it will be apparent to those skilled in the art that the method may be implemented by using software and a required universal hardware platform, and may be, of course, implemented by hardware. Based on this understanding, the technical solutions themselves of the present invention or some thereof may contribute to the related art, and in this case, a terminal device (e.g., a personal computer, a server, or a network device) may be implemented in the form of a computer software product stored in the storage medium (e.g., the ROM/RAM, the magnetic disk, or the optical disk) including various commands used for implementing the method according to each exemplary embodiment or some of the exemplary embodiments.

Hereinabove, the description of the exemplary embodiment is just for describing the technique of the present invention and is neither for completely integrate the present invention nor for limiting the present invention to an exact form described. Of course, those skilled in the art can variously modified and change the present invention according to the above-described contents. The specific principles of the present invention and their actual application are analyzed, and otherwise understanding and implementing otherwise are easily understood and the exemplary embodiment is selected and described so as to use various exemplary embodiments of the present invention and various optional forms and modified forms. The scope of the present invention is limited by the appended claims and a form equivalent thereto.

DESCRIPTION OF SYMBOLS

101: Input text row/column image I
102: Feature extractor
1021: Normalization module
1022: CNN module
1023: Positional encoding module
103: Feature map
104: Encoder
105: Hidden representation
106: Decoder
107: Recognition result
201: Image normalization
202: 3×3 convolution
203, 204, 205, 206, 207, 208, 209: Convolution block
211, 212, 222: 1×1 convolution
221: Initial feature map
223, 224: Upsampling
301: Encoder input
311: $MEA_{Local}$
312: $MEA_{Neighbor}$
313: $MEA_{Global}$
321, 322, 323: 1×1 convolution
331: Local attention expression
332: Neighboring attention expression
333: Global attention expression
341: Concatenation
351: Mixed attention expression
361: Feed forward network module
371: Encoder output
401: Text ground-truth
402: Encoder output
411: Character embedding
412: Positional encoding
413: Self-attention layer with mask
414: Encoder-decoder attention layer
415: Feed forward network module
416: Fully connected layer
417: Recognition result
421: Input at the first time
422, 442, 462: Encoder output
427: Recognition result
428: Recognition result log likelihood value
431, 451, 371: Character embedding
432, 452, 472: Positional encoding
433, 453, 473: Self-attention layer
434, 454, 474: Encoder-decoder attention layer
435, 455, 475: Feed forward network module
436, 456, 476: Fully connected layer
437: Output at the first time step
438: Character probability log likelihood value
441: Input at the second time step
457: Output at the second time step
461: Input at the fifth time step
478: Output at the fifth time step
481: Encoder output
482: Start symbol
483: Forward decoder
484: Backward decoder
485: Decoder direction selection
486: Final recognition result

What is claimed is:

1. A method of multi-directional scene text recognition based on multi-element attention mechanism, comprising:

performing, by a feature extractor, normalization processing for a text row/column image I output from an external text detection module;

extracting, by the feature extractor, a feature for the normalized image by using a deep convolutional neural network to acquire an initial feature map $F_0$;

adding, by the feature extractor, a 2-dimensional directional positional encoding P to the initial feature map $F_0$ in order to output a multi-channel feature map F, wherein the size of the feature map F is HF×WF, and a number of channels is D;

modeling, by an encoder, each element of the feature map F output from the feature extractor as a vertex of a graph;

converting, by the encoder, the multi-channel feature map F into a hidden representation H through designing a local adjacency matrix, a neighboring adjacency matrix, and a global adjacency matrix for the graph and implementing multi-element attention mechanisms of local, neighboring, and global; and converting, by a decoder, the hidden representation H output from the encoder into recognized text and setting the recognized text as the output result, wherein the encoder, is constituted by two identical encoding unit stacks, and each encoding unit includes a local attention module $MEA_{Local}$, a neighboring attention module $MEA_{Neighbor}$, and a global attention module $MEA_{Global}$, and a feed forward network module, and decomposes the elements of the multi-channel feature map F to a vector according to column order, and obtains a feature matrix X, and the dimension of the feature matrix X is N×D, i.e., an N-row and D-column matrix, the N represents the number of elements of each channel, $N=H_F \times W_F$, and D represents the number of channels of the feature map F.

2. The method of claim 1, wherein:
the performing of the normalization processing for the text row/column image I output from the external text detection module by the feature extractor includes,
determining, by the feature extractor, whether the text row/column image I is a horizontal or vertical text according to the width and the height of the text row/column image I, and setting a horizontal/vertical flag according to the determination result;
when the height of the text row/column image I is larger than γ times of the width of the text row/column image I, setting, by the feature extractor, setting the horizontal/vertical flag to 0 which is corresponding to vertical text;
when the height of the text row/column image I is equal to or smaller than γ times of the width of the text row/column image I, setting, by the feature extractor, setting the horizontal/vertical flag to 1 which is corresponding to horizontal text, and setting y to a constant number of 1.5;
setting, by the feature extractor, the image normalization width $W_I$ to 256, and setting the height $H_I$ to 64 in the case of the horizontal text; and
setting, by the feature extractor, the image normalization width $W_I$ to 64, and setting the height $H_I$ to 256 in the case of the vertical text, and
a bilinear interpolation method is used for the image normalization.

3. The method of claim 2, wherein:
when the horizontal/vertical flag is 1, the positional encoding P is $$P_{(i,j,2k)}=\sin(j/T^{2k/D}),$$

$$P_{(i,j,2k+1)}=\cos(j/T^{2k/D}) \text{ and,}$$

when the horizontal/vertical flag is 0, the positional encoding P is, $$P_{(i,j,2k)}=\sin(i/T^{2k/D}), \text{ and}$$

$$P_{(i,j,2k+1)}=\cos(i/T^{2k/D}),$$

wherein (i, j) represents an i-th row, j-th column location in the initial feature map $F_0$, k represents the index channel number of the initial feature map $F_0$, D represents the number of channels of the initial feature map $F_0$, and T represents a predetermined constant number, and
a multi-channel feature map F is acquired by adding the positional encoding P and the initial feature map $F_0$, and $$F=F_0+P.$$

4. The method of claim 1, wherein:
the deep convolutional neural network is a U-shaped structure deep convolutional neural network, and the deep convolutional neural network adopted EfficientNet-B3 as backbone network,
an output through the deep convolutional neural network is the initial feature map $F_0$ in which the size is $H_F \times W_F$ and the number of channels is D,
the deep convolutional neural network includes a total of 7 convolution blocks of the first to seventh convolution blocks, and size of the feature map output from the third convolution block is $H_F \times W_F$, the number of channels is $D_3$, the size of the feature map output from the fifth convolution block is $$\frac{H_F}{2} \times \frac{W_F}{2},$$

and the number of channels is $D_5$, and the size of the feature map output from the seventh convolution block is $$\frac{H_F}{4} \times \frac{W_F}{4},$$

and the number of channels is D, and
the feature map output from the seventh convolution block after the upsampling operation is added to the output result acquired by passing the output of the fifth convolution block through a 1×1 convolution with the channel number of D, and the acquired result after the upsampling operation is added to the output result acquired by passing the output of the third convolution block through a 1×1 convolution with the channel number of D, and the initial feature map $F_0$ is acquired through one 1×1 convolution with the channel number of D.

5. The method of claim 1, wherein
the calculation of the multi-element attention mechanism, is represented by $$MEA(X) = \text{softmax}\left(\frac{AXW_Q W_K^T X^T B^T}{\sqrt{D}}\right) XW_V,$$

and here, $W_Q$, $W_K$, and $W_V$ are parameter matrices, each dimension is D×D, adjacency matrices A and B are used for modeling the spatial correlation of the feature after mapping by $W_Q$ and $W_K$, and the dimension is N×N.

6. The method of claim 5, wherein:
in the local attention module $MEA_{Local}$, adjacency matrices A1 and B1 of the $MEA_{Local}$ are identity matrices,
in the neighboring attention module $MEA_{Neighbor}$, adjacency matrices A2 and B2 of the $MEA_{Neighbor}$ have the save form as a circulant matrix which is subjected to a convolution operation for the feature map F by using a convolution kernel with the size of k×k and all 1s as the element values, and wherein, a value of k is smaller than the width and the height of the feature map F, and
in the global attention module $MEA_{Global}$, values of the adjacency matrices A3 and B3 of the $MEA_{Global}$ are randomly initialized, and trained with the entire network, in respect to calculation of $AXW_Q$ and $W_K^T X^T B^T = (BXW_K)$, two fully connected layers are respectively used on the feature vector dimension and the channel dimension,
the adjacency matrices A comprises the A1, the A2, and the A3,
the adjacency matrices B comprises the B1, the B2, and the B3, and
the adjacency matrices A1, A2, A3, B1, B2, and B3 are implemented by using a 1-dimensional convolution operation in which the size of the convolution kernel is 1×1, and the number of channels is N, and parameter matrices $W_Q$ and $W_K$ are implemented by using a 1-dimensional convolution task in which the size of the convolution kernel is 1×1, and the number of channels is D.

7. The method of claim 5, wherein:
the calculation process of the hidden representation H is
H=LN(Z+FFD(Z)),
wherein LN means a layer normalization operation, and Z+FFD(Z) means a residual connection,
the calculation process of a feed forward network module is FFD(Z)=conv$_2$($\varphi$(conv$_1$(Z))),
conv$_1$ and conv$_2$ denote multi-channel 1-dimensional convolutions with the kernel size of 1×1, and $\varphi$ represents an activation function of a Gaussian error linear unit (GELU), and
the calculation process of Z is Z=conv$_3$($Y_1$)‖conv$_4$($Y_2$)‖conv$_5$($Y_3$)

$Y_1$=LN(X+MEA$_{Local}$(X))

$Y_2$=LN(X+MEA$_{Neighbor}$(X))

$Y_3$=LN(X+MEA$_{Global}$(X)), and wherein conv$_3$, conv$_4$, and conv$_5$ are 1×1 convolution operations in which the number of channels is D/3, where D is the channel number of the original feature maps, the symbol "‖" means a channel-dimension concatenation operation, MEA$_{Local}$, MEA$_{Neighbor}$, and MEA$_{Global}$ mean a local attention module, a neighboring attention module, and a global attention module, respectively, and X+MEA$_{Local}$(X), X+MEA$_{Neighbor}$(X), and MEA$_{Global}$(X) are residual connections.

8. The method of claim 1, wherein:
the decoder is a bidirectional structure including a forward decoder and a backward decoder, and the forward decoder recognizes a text image in the same direction as a reading order and the backward decoder recognizes the text image in the opposite direction to the reading order,
the decoder of each direction includes two identical decoding units, and each decoding unit includes one self-attention layer, one encoder-decoder attention layer, and one feed forward network module,
the dimension output in each step of the decoder is converted into a dimension of a character set size by using one fully connected layer, and then a likelihood value of the character output in each step is acquired through a softmax function, and a log likelihood value is acquired by taking a log operation, and
for the input text row/column image I, each of the forward decoder and the backward decoder outputs one recognition result, in which the recognition result with higher log likelihood value is selected as the final recognition result, and the recognition result log likelihood value is the average value of all character log likelihood values in a text sequence.

9. The method of claim 8, wherein:
an input of the decoder includes two parts, the first part is hidden representations output from the encoder, the second part is the text ground-truth in the training stage, or the recognition text output from the decoder in the test stage, the character sequence of the second part input is gradually converted into the vector through character embedding, and processed by the self-attention layer, and then sent to the encoder-decoder attention layer together with the first part input, and the acquired result is input into the feed forward network module to acquire a decoder output,
in the training stage, mask processing is introduced into the decoder self-attention layer, and only the current character and the previous text ground-truth are used when calculating the attention score,
in the training stage, the cross entropy of the recognized text and the text ground-truth is set as the objective function, and optimization is performed for parameters of the entire network including the feature extractor, the encoder, and the decoder, and
in the training stage, horizontal scene text and vertical scene text training data are divided into two subsets according to the direction, and data of each iteration are drawn from two subsets according to Equations 1 and 2 below when training, $$p_H = \frac{N_H}{N_H + N_V} \quad \text{(Equation 1)}$$

$$p_V = \frac{N_V}{N_H + N_V} \quad \text{(Equation 2)}$$

wherein $P_H$ and $P_V$ mean sampling probabilities in a horizontal text subset and a vertical text subset, respectively, $N_H$ and $N_V$ mean the numbers of remaining samples in the horizontal text subset and the vertical text subset, respectively, and as the drawn samples, all samples of two subsets are drawn by random sampling without replacement until training of one epoch is completed.

10. A system of multi-directional scene text recognition based on multi-element attention mechanism, comprising:
a feature extractor performing normalization processing for a text row/column image I output from an external text detection module by a feature extractor, extracting a feature for the normalized image by using a deep convolutional neural network to acquire an initial feature map $F_0$, and adding a 2-dimensional directional positional encoding P to the initial feature map $F_0$ in order to output a multi-channel feature map F, wherein a size of the feature map F is $H_F \times W_F$, and the number of channels is D;
an encoder modeling each element of the feature map F output from the feature extractor as a vertex of a graph, and implementing multi-element attention mechanisms of local, neighboring, and global through designing three adjacency matrices for the graph including a local adjacency matrix, a neighboring adjacency matrix, and a global adjacency matrix to convert the multi-channel feature map F into a hidden representation H; and
a decoder converting the hidden representation H output from the encoder into recognized text and setting the recognized text as the output result,
wherein the encoder,
is constituted by two identical encoding units, and each encoding unit includes a local attention module MEA$_{Local}$, a neighboring attention module MEA$_{Neighbor}$, and a global attention module MEA$_{Global}$, and a feed forward network module, and,
decomposes the elements of the multi-channel feature map F to a vector according to column order, and obtains a feature matrix X, and the dimension of the feature matrix X is N×D, i.e., an N-row and D-column matrix, the N represents the number of elements of each channel, $N=H_F \times W_F$, and D represents the number of channels of the feature map F.

11. The system of claim 10, wherein:
the feature extractor includes,
a normalization module performing the normalization processing for the text row/column image I output from the external text detection module,
a CNN module extracting a feature for the normalized image by using the deep convolutional neural network to acquire the initial feature map $F_0$, and
a positional encoding module adding a 2D directional positional encoding P to the initial feature map $F_0$ in order to output the multi-channel feature map F.

12. The system of claim 11, wherein:
the normalization module,
determines whether the text row/column image I is a horizontal or vertical text according to the width and height of the text row/column image I output from the external text detection module, and sets a horizontal/vertical flag according to the determination result; and
when the height of the text row/column image I is larger than γ times of the width of the text row/column image I, sets the horizontal/vertical flag to 0 which is corresponding to vertical text, and when the height of the text row/column image I is equal to or smaller than γ times of the width of the text row/column image I, sets the horizontal/vertical flag to 1 which is corresponding to horizontal text, and sets γ to a constant number of 1.5;
sets the image normalization width $W_I$ to 256, and sets the height $H_I$ to 64 in the case of the horizontal text; and
sets the image normalization width $W_I$ to 64, and setting the height $H_I$ to 256 in the case of the vertical text; and
a bilinear interpolation method is used for the image normalization.

13. The system of claim 12, wherein:
the positional encoding module,
when the horizontal/vertical flag is 1, the positional encoding P is $P_{(i,j,2k)}=\sin(j/T^{2k/D})$, and $P_{(i,j,2k+1)}=\cos(j/T^{2k/D})$, and when the horizontal/vertical flag is 0, the positional encoding P is $P_{(i,j,2k)}=\sin(i/T^{2k/D})$, and $P_{(i,j,2k+1)}=\cos(i/T^{2k/D})$, acquires a multi-channel feature map F in which $F=F_0+P$ by adding the positional encoding P and the initial feature map $F_0$,
wherein (i, j) means an i-th row, j-th column location in the initial feature map $F_0$, k represents the index channel number of the initial feature map $F_0$, D means the number of channels of the initial feature map $F_0$, and T represents a predetermined constant number.

14. The system of claim 11, wherein:
the CNN module,
outputs the initial feature map $F_0$ in which the size is $H_F \times W_F$ and the number of channels is D through the deep convolutional neural network, and the deep convolutional neural network includes a total of 7 convolution blocks of the first to seventh convolution blocks, and the size of the feature map output from the third convolution block is $H_F \times W_F$, the number of channels is $D_3$, the size of the feature map output from the fifth convolution block is $$\frac{H_F}{2} \times \frac{W_F}{2},$$

and the number of channels is $D_5$, and the size of the feature map output from the seventh convolution block is $$\frac{H_F}{4} \times \frac{W_F}{4},$$

and the number of channels is D, and
the feature map output from the seventh convolution block after the upsampling operation is added to the output result acquired by passing the output of the fifth convolution block through a 1×1 convolution with the channel number of D, and the acquired result after the upsampling operation is added to the output result acquired by passing the output of the third convolution block through a 1×1 convolution with the channel number of D, then the initial feature map $F_0$ is acquired through one 1×1 convolution with the channel number of D, and
the deep convolutional neural network is a U-shaped structure deep convolutional neural network, and the deep convolutional neural network EfficientNet-B3 as backbone network.

15. The system of claim 10, wherein:
the calculation model of the multi-element attention mechanism is represented by $$MEA(X) = \text{softmax}\left(\frac{AXW_Q W_K^T X^T B^T}{\sqrt{D}}\right) XW_V,$$

and here, $W_Q$, $W_K$, and $W_V$ are parameter matrices, each dimension is D×D, adjacency matrices A and B are used for modeling the spatial correlation of the feature after mapping by $W_Q$ and $W_K$, and the dimension is N×N.

16. The system of claim 15, wherein:
in the local attention module $MEA_{Local}$,
both adjacency matrices A1 and B1 of the $MEA_{Local}$ are identity matrices, and
in the neighboring attention module $MEA_{Neighbor}$,
adjacency matrices A2 and B2 of the $MEA_{Neighbor}$ have the save form as a circulant matrix which is subjected to a convolution operation for the feature map F by using a convolution kernel with the size of k×k and all 1s as the element values, and wherein, a value of k is smaller than the width and the height of the feature map F, and
in the global attention module $MEA_{Global}$,
values of adjacency matrices A3 and B3 of the $MEA_{Global}$ are randomly initialized, and trained with the entire network, in respect to calculation of $AXW_Q$ and $W_K^T X^T B^T = (BXW_K)$, two fully connected layers are respectively used on the feature vector dimension and the channel dimension,
the adjacency matrices A comprises the A1, the A2, and the A3, the adjacency matrices B comprises the B1, the B2, and the B3, and the adjacency matrices A1, A2, A3, B1, B2, and B3 are implemented by using a 1-dimensional convolution operation in which the size of the convolution kernel is 1×1, and the number of channels is N, and parameter matrices $W_Q$ and $W_K$ are implemented by using a 1-dimensional convolution operation in which the size of the convolution kernel is 1×1, and the number of channels is D.

17. The system of claim 15, wherein:

the hidden representation H, is calculated by H=LN(Z+FFD(Z)), wherein LN means a layer normalization operation, and Z+FFD(Z) means a residual connection, the calculation process of a feed forward network module is FFD(Z)=conv$_2$(φ(conv$_1$(Z))), wherein, conv$_1$ and conv$_2$ denote multi-channel 1-dimensional convolutions with the kernel size of 1×1, and φ represents an activation function of a Gaussian error linear unit (GELU), the calculation process of Z is $$Z=conv_3(Y_1)\|conv_4(Y_2)\|conv_5(Y_3)$$

$$Y_1=LN(X+MEA_{Local}(X))$$

$$Y_2=LN(X+MEA_{Neighbor}(X))$$

$$Y_3=LN(X+MEA_{Global}(X)),$$

and wherein conv$_3$, conv$_5$, and conv$_5$ are 1×1 convolution operations in which the number of channels is D/3, where D is the channel number of the original feature maps, the symbol "∥" means a channel-dimension concatenation operation, $MEA_{Local}$, $MEA_{Neighbor}$, and $MEA_{Global}$ mean a local attention module, a neighboring attention module, and a global attention module, respectively, and X+$MEA_{Local}$(X), X+$MEA_{Neighbor}$(X), and $MEA_{Global}$(X) are residual connections.

18. The system of claim 10, wherein:

the decoder, is a bidirectional structure including a forward decoder and a backward decoder, and the forward decoder recognizes a text image in the same direction as a reading order and the backward decoder recognizes the text image in the opposite direction to the reading order, the forward decoder and the backward decoder include two identical decoding units, and each decoding unit includes one self-attention layer, one encoder-decoder attention layer, and one feed forward network module, the dimension output in each step of the decoder is converted into a dimension of a character set size by using one fully connected layer, and then the likelihood value of the character output in each step is acquired through a softmax function, and the log likelihood value is acquired by taking a log operation, and for the input text row/column image I, each of the forward decoder and the backward decoder outputs one recognition result, in which the recognition result with higher log likelihood value is selected as the final recognition result, and the recognition result log likelihood value is an average value of all character log likelihood values in a text sequence.

19. The system of claim 18, wherein:

an input of the decoder includes two parts, the first part is hidden representations output from the encoder, the second part is the text ground-truth in the training stage, or the recognition text output from the decoder in the test stage, the character sequence of the second part input is gradually converted into the vector through character embedding, and processed by the self-attention layer, and then sent to the encoder-decoder attention layer together with the first part input, and the acquired result is input into the feed forward network module to acquire a decoder output, in the training stage, mask processing is introduced into the decoder self-attention layer, and only the current character and the previous text ground-truth are used when calculating the attention score, in the training stage, the cross entropy of the recognized text and the text ground-truth is set as the objective function, and optimization is performed for parameters of the entire network including the feature extractor, the encoder, and the decoder, and in the training stage, horizontal scene text and vertical scene text training data are divided into two subsets according to the direction, and data of each iteration are drawn from two subsets according to Equations 3 and 4 below when training, $$p_H = \frac{N_H}{N_H + N_V} \quad \text{(Equation 3)}$$

$$p_V = \frac{N_V}{N_H + N_V} \quad \text{(Equation 4)}$$

wherein $P_H$ and $P_V$ mean sampling probabilities in a horizontal text subset and a vertical text subset, respectively, $N_H$ and $N_V$ mean the numbers of remaining samples in the horizontal text subset and the vertical text subset, respectively, and as the drawn samples, all samples of two subsets are drawn by random sampling without replacement until training of one epoch is completed.

* * * * *